(118.)
ROBERT M. LAFFERTY.
Pumps.
No. 4,678. Reissued Dec. 19, 1871.
Fig. 1.
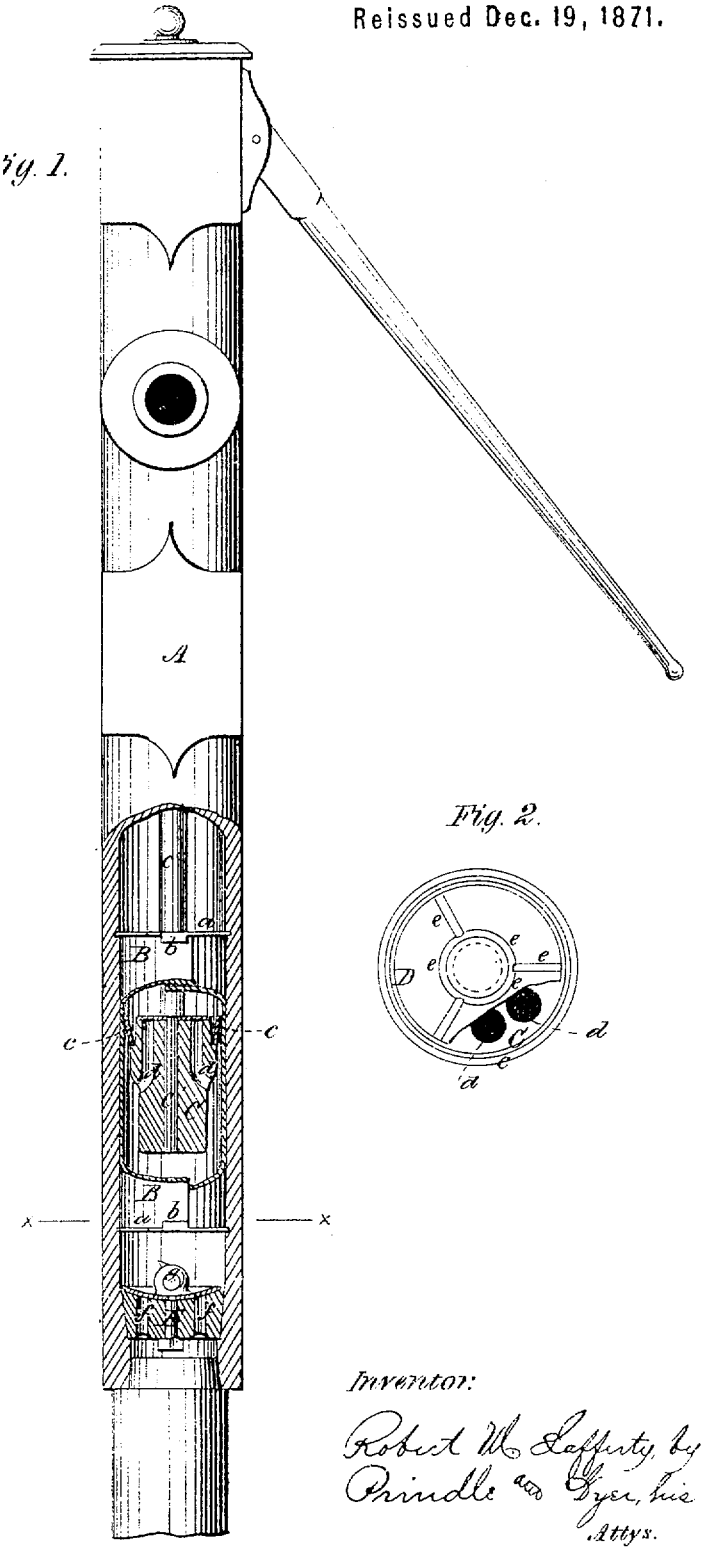
Fig. 3.
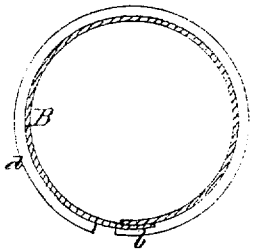
Fig. 4.
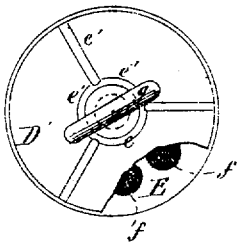
Fig. 2.
Witnesses.
A. E. L. Merle
John R. Young
Inventor:
Robert M. Lafferty, by
Prindle and Dyer, his
Attys.

UNITED STATES PATENT OFFICE.

ROBERT M. LAFFERTY, OF THREE RIVERS, MICHIGAN, ASSIGNOR TO HIMSELF AND EDWARD P. SMITH, OF SAME PLACE.

IMPROVEMENT IN PUMPS.

Specification forming part of Letters Patent No. 104,604, dated June 21, 1870; reissue No. 4,678, dated December 19, 1871.

*To whom it may concern:*

Be it known that I, ROBERT M. LAFFERTY, of Three Rivers, in the county of St. Joseph and State of Michigan, have invented a new and useful Improvement in Pumps; and I do declare that the following is a true and accurate description thereof, reference being had to the accompanying drawing and to the letters of reference marked thereon and being a part of this specification, in which—

Figure 1 is an elevation, partially in section, of my improved pump. Fig. 2 is a plan, partially in section, of the pump-piston. Fig. 3 is a horizontal section of the lining of the barrel, taken on the line *x x* in Fig. 1; and Fig. 4 is a plan of the foot-valve, also partially in section.

Like letters refer to like parts in each figure.

The nature of this invention relates to an improved construction of wooden pumps; and consists in the arrangement, within the pump-barrel, of a sheet-metal lining or bushing and the peculiar method of securing the same in place; also, in the novel construction of the piston and valves; and in the ingenious arrangement of the various parts, as more fully hereinafter described.

In the accompanying drawing, A represents a wooden pump-head or stock, which is attached to a pipe or tube terminating in the water, and in which the working parts are arranged as shown in Fig. 1. B is a sheet-metal lining, which may be a cylinder, to fit the bore of the stock; or the lining may be made cylindrical in form and so that the ends of the sheet of which it is made will lap by each other, as shown in Fig. 1; and it has a flange, *a*, turned outward on its upper and lower edges and extending nearly or quite around it. *b* is a lip formed at the commencement of each flange, said lips pointing toward each other. The sheet of metal so arranged is formed into a cylinder by inserting the side where the flange is cut off into the lips *b*. The lining is then inserted in the barrel, where it is held in place by the flanges entering the walls of the barrel, either by expanding the lining and forcing them into the walls or by crozing therein a pair of grooves for their reception, the outward spring of the metal tending to keep it in contact with the barrel, following it when it expands and giving way to it in its contraction, the lips being employed simply to hold the laps together. C is a piston attached to the reciprocating piston-rod C′, operated in the usual manner. *c* is a cup-leather or packing, secured around the top of the wooden piston, which is chamfered at its edge to form an annular water-chamber between it and the cup-leather, reaching nearly down to the base of the latter, wedging the leather outward in the upward stroke of the piston. The lower half of the valve is diminished in diameter, as shown, and, from this part, a row of openings, *d*, enter the piston and are carried up through its top, as shown in Fig. 1. In the ordinary mode of constructing such pistons the openings for the passage of the water are bored directly through them, weakening them to such an extent that they readily split off. In the present form the liability to split is avoided by carrying the lower solid part of the piston well below the entrance of the openings, thus insuring great strength therein. D is a disk, of stiff leather, forming a valve or series of valves, secured by a shoulder in the rod to the center of the piston. It is radially and concentrically grooved, as shown at *e*, Fig. 2, the parts between the grooves forming valves, which, in the downward stroke, are enabled to rise, by reason of the flexibility of the grooved parts of the disk. E is a plug, perforated with suitable openings *f* for the admission of water. D′ is a disk forming the foot-valve, constructed as above described, and centrally secured to the plug by the eye-bolt *g*, by means of which the plug may be withdrawn from the pump-barrel, if desired. The plug E differs in construction from those in ordinary use in this, that its top is concaved or cup-shaped to about the shape that the valves would, from use, assume, so that, where there is not the weight of a high column of water imposed on the valve, it will readily close down on the upper surface of the plug. When a pump-barrel and tube are of the same diameter throughout the lining may be carried down to the bottom of the barrel and held in place by the upper end of the tube expanding it outward against the walls of the barrel.

What I claim as my invention, and desire to secure by Letters Patent, is—

1. The sheet-metal lining B secured in the interior of the wooden stock A by turning or flanging the ends of the tube forming the lining into grooves cut in the stock, substantially as set forth.

2. The piston *c* provided with the curved openings *d* and with the cup-leather *c* and valve D, when each of said parts is constructed as described, and arranged to operate, as and for the purposes set forth.

3. In combination with the parts named in the preceding paragraph, the plug E with concave upper face, openings *f*, and cup-leather D′, all constructed and arranged to operate, as and for the purposes set forth.

4. The combination and arrangement of the barrel A, lining B, piston C, plug E, and valve D D′, when each part is constructed, arranged, and operating, substantially as described, and for the purposes set forth.

ROBERT M. LAFFERTY.

Witnesses:
H. F. EBERTS,
M. STEWART.

(118)